United States Patent
Wang et al.

(10) Patent No.: US 9,996,019 B1
(45) Date of Patent: Jun. 12, 2018

(54) COLD PRESSURE FIX TONER COMPOSITIONS AND PROCESSES

(71) Applicant: Xerox Corporation, Norwalk, CT (US)

(72) Inventors: Yulin Wang, Oakville (CA); Guerino G. Sacripante, Oakville (CA); Richard P. N. Veregin, Mississauga (CA); Edward G. Zwartz, Mississauga (CA); Kathryne S. Brockman, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 0 days. days.

(21) Appl. No.: 15/449,263

(22) Filed: Mar. 3, 2017

(51) Int. Cl.
*G03G 9/093* (2006.01)
*C08G 77/50* (2006.01)
*G03G 9/087* (2006.01)

(52) U.S. Cl.
CPC ......... *G03G 9/09371* (2013.01); *C08G 77/50* (2013.01); *G03G 9/08755* (2013.01); *G03G 9/08773* (2013.01); *G03G 9/09321* (2013.01)

(58) Field of Classification Search
CPC ............. G03G 9/0855; G03G 9/08773; G03G 9/09371; G03G 9/08755; G03G 9/09328
See application file for complete search history.

(56) References Cited

U.S. PATENT DOCUMENTS

| | | | | |
|---|---|---|---|---|
| 5,466,554 A * | 11/1995 | Sacripante | ......... | G03G 9/08755 430/108.8 |
| 5,620,825 A * | 4/1997 | Tavernier | ............. | G03G 5/0546 430/108.3 |
| 5,639,582 A * | 6/1997 | Imai | .................... | G03G 9/08773 430/108.3 |
| 6,664,015 B1 * | 12/2003 | Sacripante | ......... | C08G 63/6886 430/108.1 |
| 7,538,157 B2 | 5/2009 | Mayes et al. | | |
| 8,273,516 B2 | 9/2012 | Wosnick et al. | | |
| 9,063,446 B2 * | 6/2015 | Miyaake | .............. | G03G 9/0821 |
| 9,405,207 B2 | 8/2016 | Wosnick et al. | | |
| 9,671,709 B2 * | 6/2017 | Sun | ..................... | G03G 9/09371 |
| 9,738,759 B1 * | 8/2017 | Sacripante | ........... | C08G 77/445 |
| 2007/0048647 A1 * | 3/2007 | Daimon | ............. | G03G 9/09328 430/110.2 |
| 2008/0318141 A1 * | 12/2008 | Shin | .................... | G03G 9/09328 430/48 |
| 2009/0047593 A1 * | 2/2009 | Vanbesien | .......... | G03G 9/08795 430/110.2 |
| 2009/0305159 A1 * | 12/2009 | Zhou | .................... | G03G 9/0819 430/110.2 |
| 2012/0277394 A1 * | 11/2012 | Taniguchi | .............. | C08G 18/61 528/28 |
| 2012/0295188 A1 * | 11/2012 | Nakajima | .......... | G03G 9/08755 430/105 |
| 2015/0099220 A1 * | 4/2015 | Abe | .................... | G03G 9/09328 430/108.3 |
| 2015/0307744 A1 * | 10/2015 | Lee | ......................... | C08L 83/10 428/213 |
| 2017/0255115 A1 * | 9/2017 | Tonegawa | ............ | G03G 9/0804 |

FOREIGN PATENT DOCUMENTS

JP         2002012657 A  *  1/2002

OTHER PUBLICATIONS

"DMS-C15—Carbinol (Hydroxyl) Terminated Polydimethylsiloxane" Gelest, Inc. 6 pages (Aug. 2015).*
"DMS-C23—Carbinol (Hydroxyl) Terminated Polydimethylsiloxane" Gelest, Inc. 6 pages (Aug. 2015).*
"DBE-C25—Carbinol (Hydroxyl) Terminated Polydimethylsiloxane" Gelest, Inc. 6 pages (Dec. 2014).*
Poly(dimethylsiloxane), bis(hydroxyalkyl) terminated average MN-5600. Product No. 481246. Sigma-Aldrich. 1 page (Jun. 2010).*
English language machine translation of JP 2002-012657 (Jan. 2002).*

* cited by examiner

*Primary Examiner* — Christopher D RoDee
(74) *Attorney, Agent, or Firm* — Eugene O. Palazzo (57) ABSTRACT

Disclosed are cold pressure fix toner compositions that include a core of a colorant, and a mixture of a co-polyester-co-polydimethylsiloxane and an amorphous resin, and a polymer shell thereover.

19 Claims, 1 Drawing Sheet

COLD PRESSURE FIX TONER COMPOSITIONS AND PROCESSES

The present disclosure is generally directed to toners, and more specifically to cold pressure fix toners comprising a core of a co-polyester-co-polydimethylsiloxane and an amorphous resin, and thereover a polymeric shell.

BACKGROUND

A number of cold pressure fixing (CPF) toner compositions are known. These toners can function in an electrophotographic apparatus that selects a pair of high pressure rollers to fix the toner, without heating, to paper. One example of a cold pressure fix toner comprises an ethylene-vinyl acetate copolymer and a polyamide thermoplastic polymer, each with certain temperature softening points.

Illustrated in U.S. Pat. No. 9,405,207 are certain toners that comprise at least one amorphous polyester resin, an optional colorant, an optional wax, and at least one crystalline polyester resin, the at least one crystalline polyester resin being formed by combining at least one component selected from the group consisting of lactones, lactides, cyclic anhydrides, cyclic carbonates, and combinations thereof, with an enzyme selected from the group consisting of lipases, cutinases, and combinations thereof.

In U.S. Pat. No. 8,273,516 there are illustrated cold pressure fix toners comprising a baroplastic resin comprising a block copolymer comprising at least one soft segment in combination with at least one hard segment, and one or more ingredients selected from the group consisting of colorants, waxes, coagulants, and combinations thereof.

In U.S. Pat. No. 7,538,157, there are disclosed compositions capable of being processed by the application of pressure, and which compositions contain baroplastic materials, and more specifically compositions that include a first material that is a solid at a certain temperature and a second entrapped material that is a fluid at a certain temperature. Pressure is applied to the composition, in the form of particles, sufficient to cause at least a portion of the first material to exhibit fluidity at a temperature at which, in the absence of the pressure, the portion of the first material remains solid, and that causes mixing of at least some of the first and second material together.

Cold pressure fix toners comprising, for example, at least one crystalline polyester material having a melting point in a range of from about 30° C. to about 130° C., and at least one $C_{16}$ to $C_{80}$ amorphous organic material having a glass transition temperature (Tg) of from about a minus 30° C. to about 70° C., where the at least one amorphous organic material is a rosin ester, optionally a hydrogenated rosin ester, or optionally a modified rosin ester, are illustrated in copending U.S. patent application Ser. No. 15/069,453, filed Mar. 14, 2016, the disclosure of which is totally incorporated herein by reference.

There is a need for cold pressure fix toners and processes thereof that minimize, or substantially eliminate the disadvantages illustrated herein.

Also, there is a need for compositions and cold pressure fixing toners that include baroplastic materials.

There is also a need for cold pressure fixing toners that can be fused at sufficiently low temperatures thereby resulting in substantial cost savings.

Yet another need resides in providing cold pressure fixing toners that permit excellent and reduced fuser wear compared to several known cold pressure fixing toners.

Additionally, there is a need for cold pressure fixing toners that require less power to be supplied to a fuser component present in xerographic copying and printing systems.

Cold pressure fixing toner compositions with decreased energy requirements for printing, and that perform like conventional toners are also needed.

Moreover, needed are environmentally acceptable cold pressure fixing toners that allow the achievement of the acceptable permanent fixing of images to a substrate, and where these toners also possess acceptable pen-offset and excellent charging characteristics.

There is also a need for cold pressure fixing toners that include a core generated utilizing solvent-free emulsification of a crystalline polyester.

Further, there is desired cold pressure fix toner composition processes where there is involved the phase inversion emulsification of a core latex derived from a crystalline resin.

These and other needs and advantages are achievable in embodiments with the processes and compositions disclosed herein.

SUMMARY

Disclosed is a cold pressure fix toner composition comprising a colorant, a core comprising a crystalline co-polyester-co-polydimethylsiloxane resin and an amorphous resin, and a polymer shell thereover.

Also, disclosed is a cold pressure fix toner comprising a core comprising a colorant, wax, optional additives, and a mixture of a co-polyester-co-polydimethylsiloxane and an amorphous resin, and a shell thereover comprised of a polymer, and wherein said co-polyester-co-polydimethylsiloxane is represented by the following formula/structure wherein $R^1$ and $R^2$ are methyl, a is a number of from 1 to about 1,000, b is a number of from 1 to about 100, m is a number of from 2 to about 12, n is a number of from 0 to about 12, p is a number of from 5 to about 1,000, and a and b represent random segments of said co-polyester-co-polydimethylsiloxane, and wherein the sum of a and b is about 100 percent.

Additionally, disclosed is a cold pressure fix toner composition comprising a core comprising a mixture of a colorant, a wax, a co-polyester-co-polydimethylsiloxane crystalline resin represented by wherein $R^1$ and $R^2$ are methyl, a is a number of from 1 to about 1,000, b is a number of from 1 to about 100, m is a number of from 6 to about 10, n is a number of from 4 to about 10, p is a number of from 5 to about 1,000, and a and b represent random segments of said co-polyester-co-polydimethylsiloxane crystalline resin, and an amorphous resin selected from the group consisting of of copoly-(propoxylated bisphenol A-terephthalate)-copoly-(propoxylated bisphenol A-dodecenylsuccinate)-copoly-(propoxylated bisphenol A-fumarate), copoly-(propoxylated bisphenol A-terephthalate)-copoly-(propoxylated bisphenol A-dodecenylsuccinate)-copoly-(ethoxylated bisphenol A-terephthalate)-copoly-(ethoxylated bisphenol A-dodecenylsuccinate)-copoly-(propoxylated bisphenol A-trimellitate)-copoly-(ethoxylated bisphenol A-trimellitate), poly(propoxylated bisphenol A-co-fumarate), copoly(propoxylated bisphenol-fumarate)-copoly(trimethylolpropoxylated-bisphenol-fumarate), copoly(ethoxylated bisphenol-fumarate)-copoly(trimethylolpropoxylated-bisphenol-fumarate), copoly-(propoxylated bisphenol A-terephthalate)-copoly-(propoxylated bisphenol A-dodecenylsuccinate)-copoly-(propoxylated bisphenol A-fumarate)-(propoxylated bisphenol A-trimellitate), and copoly(propoxylated 1,4-diphenol-fumarate)-copoly(qlycerinoxylated-diphenol-fumarate), and a shell encasing said core, which shell is selected from the group comprising a styrene acrylate and an amorphous resin.

Co-polyester-co-polydimethylsiloxanes

Examples of the co-polyester-co-polydimethylsiloxane, which are believed to be available from, for example, E.I. DuPont, included in the cores of the disclosed cold pressure fixing toners in amounts of, for example, from about 20 percent by weight to about 80 percent by weight, from about 10 percent by weight to about 75 percent by weight, from about 25 to about 75 percent by weight, from about 45 percent by weight to about 50 percent by weight, or from about 50 percent by weight to about 80 percent by weight, based for example on the core toner solids, are illustrated by reaction Scheme I below.

Scheme I wherein R1 and R2 are methyl; a, b, m, n, and p represent the number of repeating segments, and where, for example, a is a number of from 1 to about 1,000, b is a number of from 1 to about 100, m is a number of from about 2 to about 12, n is zero (0), or n is a number of from about 2 to about 12, and p is a number of from about 5 to about 10,000, and a and b represent random segments of the copolymer, and wherein the sum of a and b is about 100 percent.

The co-polyester-co-polydimethylsiloxanes, selected for the disclosed cold pressure fixing toners, can be represented by the following formula/structure wherein $R^1$ and $R^2$ are methyl; a, b, m, n, and p represent the number of repeating segments, and more specifically, where a is a number of from 1 to about 1,000, from about 100 to about 500, or about 300 to about 700; b is a number of from 1 to about 100, from about 50 to about 75, or from about 40 to about 75; m is a number of from 2 to about 12, or from 6 to about 10; n is zero (0), or where n is a number of from about 2 to about 12, or from about 4 to about 10; and p is a number of from 5 to about 1,000, from about 325 to about 725, or from about 100 to about 500, and a and b represent random segments of the copolymer, and wherein the sum of a and b is about 100 percent.

In embodiments, the co-polyester-co-polydimethylsiloxane, as illustrated herein, can be prepared by the reaction of an organic diacid, an organic diol and a carbinol (hydroxyl) terminated dimethylsiloxane.

Examples of organic diacids or diesters selected for the preparation of the co-polyester-co-polydimethylsiloxane include oxalic acid, succinic acid, glutaric acid, adipic acid, suberic acid, azelaic acid, sebacic acid, dodecanedioic acid, phthalic acid, isophthalic acid, terephthalic acid, napthalene-2,6-dicarboxylic acid, naphthalene-2,7-dicarboxylic acid, cyclohexane dicarboxylic acid, malonic acid and mesaconic acid, a diester or anhydride thereof. The organic diacid may be selected in an amount of, for example, from about 45 to about 55 mole percent of the resin.

Examples of organic diols selected for the preparation of the disclosed co-polyester-co-polydimethylsiloxane include aliphatic diols, especially alkyl diols, with from about 2 to about 36 carbon atoms, such as 1,2-ethanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,12-dodecanediol, and the like. The aliphatic diol is, for example, selected in an amount of from about 45 to about 55 mole percent of the resin.

Examples of carbinol (hydroxyl) terminated polydimethylsiloxanes selected for the preparation of the disclosed co-polyester-co-polydimethylsiloxanes include bis(3-hydroxy propyl)-polydimethylsiloxane, bis(2-hydroxy ethyl)-polydimethylsiloxane, bis(4-hydroxy butyl)-polydimethylsiloxane, available from Gelest Incorporated, as DMS-15 to DMS-23, and wherein the weight average molecular weight of the carbinol (hydroxyl) terminated polydimethylsiloxane diol is, for example, from about 300 to 30,000 grams per mole, as determined by Gel Permeation Chromatography (GPC analysis), and which exhibit a viscosity of, for example, from about 30 centistokes to about 300 centistokes.

The co-polyester-co-polydimethylsiloxane selected for the disclosed pressure fix toners has a number average molecular weight ($M_n$) of, for example, from about 2,000 Daltons to about 50,000 Daltons, or from about 4,000 Daltons to about 10,000 Daltons, and a weight average molecular weight ($M_w$) of from about 5,000 Daltons to about 100,000 Daltons, or from about 10,000 Daltons to about 50,000 Daltons, which molecular weights can be determined by Gel Permeation Chromatography.

Specific crystalline co-polyester-co-polydimethylsiloxanes included in the illustrated herein cold pressure fixing cores are copoly(hexylene dodecanoate)-copoly-(3-propyl-dimethylsiloxane), copoly(butylene dodecanoate)-copoly-(3-propyl-dimethylsiloxane), copoly-(ethylene sebacate)-copoly-(3-propyl-dimethylsiloxane), copoly-(butylene sebacate)-copoly-(3-propyl-dimethylsiloxane), copoly-(butylene decanoate)-copoly-(3-propyl-dimethylsiloxane), Resin A of a copoly-(ethylene dodecanoate)-copoly-(3-propyl-dimethylsiloxane), Resin B of a copoly-(nonylene dodecanoate)-copoly-(3-propyl-dimethylsiloxane), and optionally mixtures thereof with Resin A and Resin B having the characteristics shown in Table 1 disclosed herein.

Compatible Amorphous Resins

There can be included in the cores of the disclosed cold pressure fixing toners in amounts of, for example, from about 25 percent by weight to about 80 percent by weight, from about 25 percent by weight to about 50 percent by weight, from about 20 percent by weight to about 50 percent by weight, or from about 50 percent by weight to about 60 percent by weight of the toner, a number of suitable amorphous resins such as terpoly-(propoxylated bisphenol A-terephthalate)-terpoly-(propoxylated bisphenol A-dodecenylsuccinate)-terpoly-(propoxylated bisphenol A-fumarate), terpoly-(propoxylated bisphenol A-terephthalate)-terpoly-(propoxylated bisphenol A-dodecenylsuccinate)-terpoly-(ethoxylated bisphenol A-terephthalate) terpoly-(ethoxylated bisphenol A-dodecenylsuccinate)-terpoly-(propoxylated bisphenol A-trimellitate)-terpoly-(ethoxylated bisphenol A-trimellitate), poly(propoxylated bisphenol A-co-fumarate), copoly(propoxylated bisphenol-fumarate)-copoly(trimethylol propoxylated-bisphenol-fumarate), copoly(ethoxylated bisphenol-fumarate)-copoly (trimethylolpropoxylated-bisphenol-fumarate), copoly (butoxylated bisphenol-fumarate)-copoly(trimethylol propoxylated-bisphenol-fumarate), copoly(propoxylated 1,4-diphenol-fumarate)-copoly(glycerinoxylated-diphenol-fumarate), and mixtures thereof.

The amorphous polyester resins can possess, for example, a number average molecular weight ($M_n$) as measured by GPC using polystyrene standards of, for example, from about 5,000 to about 100,000, from about 10,000 to about 75,000, or, from about 5,000 to about 50,000. The weight average molecular weight ($M_w$) of the amorphous polyester resins can be, for example, from about 2,000 to about 100,000, from about 15,000 to about 85,000, or from about 5,000 to about 80,000, as determined by GPC using polystyrene standards. The molecular weight distribution ($M_w/M_n$), or polydispersity of the amorphous polyester resin is, for example, from about 2 to about 8, from about 2 to about 6, or from about 3 to about 5.

Optional Waxes

Numerous suitable optional waxes be selected for the toners illustrated herein, and which waxes can be included in the disclosed core, in at least one shell, and in both the core, and the at least one shell.

Examples of optional waxes selected for the disclosed toners include polyolefins, such as polypropylenes, polyethylenes, and the like, such as those commercially available from Allied Chemical and Baker Petrolite Corporation; wax emulsions available from Michaelman Inc. and the Daniels Products Company; EPOLENE N-15™ commercially available from Eastman Chemical Products, Inc.; VISCOL 550-P™, a low weight average molecular weight polypropylene available from Sanyo Kasei K.K., and similar materials. Examples of functionalized waxes that can be selected for the disclosed toners include amines, amides of, for example, AQUA SUPERSLIP 6550™ and SUPERSLIP 6530™, both available from Micro Powder Inc.; fluorinated waxes of, for example, POLYFLUO 190™, POLYFLUO 200™, POLYFLUO 523XF™, AQUA POLYFLUO 411™, AQUA POLYSILK 19™ and POLYSILK 14™, all available from Micro Powder Inc.; mixed fluorinated, amide waxes, for example, MICROSPERSION 19™ available from Micro Powder Inc.; imides, esters, quaternary amines, carboxylic acids or acrylic polymer emulsions of, for example, JONCRYL 74™, 89™, 130™, 537™, and 538™, all available from SC Johnson Wax; chlorinated polypropylenes and chlorinated polyethylenes available from Allied Chemical, Petrolite Corporation, and SC Johnson Wax.

The wax can be in the form of a dispersion comprising, for example, a wax having a particle diameter of from about 100 nanometers to about 500 nanometers, or from about 100 nanometers to about 300 nanometers, water, and an anionic surfactant, or a polymeric stabilizer, and optionally a nonionic surfactant. In embodiments, the wax comprises polyethylene wax particles, such as POLYWAX® 655, or POLYWAX® 725, POLYWAX® 850, POLYWAX® 500 (the POLYWAX® waxes being commercially available from Baker Petrolite), and, for example, fractionated/distilled waxes, which are distilled parts of commercial POLYWAX® 655 designated as X1214, X1240, X1242, X1244, and the like.

In embodiments, the wax is in the form of a dispersion comprising, for example, a wax having a particle diameter of from about 100 nanometers to about 500 nanometers, or from about 100 nanometers to about 300 nanometers, water, and an anionic surfactant, or a polymeric stabilizer, and optionally a nonionic surfactant. In embodiments, the wax selected for the disclosed toners comprises polyethylene wax particles, such as POLYWAX® 655, or POLYWAX® 725, POLYWAX® 850, POLYWAX® 500 (the POLYWAX® waxes being commercially available from Baker Petrolite), and, for example, fractionated/distilled waxes, which are distilled parts of commercial POLYWAX® 655, see for example U.S. Pat. Nos. 7,553,596 and 7,749,670, both incorporated herein in their entirety. Other toner wax examples include FT-100 waxes available from Shell (SMDA), and FNP0092 available from Nippon Seiro. The surfactant used to disperse the wax can be, for example, an anionic surfactant, such as NEOGEN RK® commercially available from Daiichi Kogyo Seiyaku, TAYCAPOWER® BN2060 commercially available from Tayca Corporation, or DOWFAX® available from E.I. DuPont.

Also, waxes can be selected that possess certain viscosity/temperature criteria, wherein the upper limit of viscosity is, for example, about 10,000 cps, and the temperature upper limit is, for example, about 100° C. These waxes can have a particle size diameter in the range of, for example, from about 100 nanometers to about 500 nanometers, or from about 200 nanometers to about 375 nanometers.

The toner wax amount can be, for example, from about 0.1 percent by weight to about 20 percent by weight, from about 0.5 percent by weight to about 15 percent by weight, from about 1 percent by weight to about 12 percent by weight, from about 1 percent by weight to about 10 percent by weight, from about 4 percent by weight to about 9 percent by weight, from about 1 percent by weight to about 5 percent by weight, from about 1 percent by weight to about 4 percent by weight, or from about 1 to about 3 percent by weight, based on the toner solids.

Optional Colorants

Examples of toner colorants present in the disclosed cold pressure fix toner core include pigments, dyes, mixtures of pigments and dyes, mixtures of pigments, mixtures of dyes, and the like. In embodiments, the colorant comprises carbon black, magnetite, black, cyan, magenta, yellow, red, green, blue, brown, and mixtures thereof.

The toner colorant can be selected, for example, from cyan, magenta, yellow, or black pigment dispersions of each color contained in an anionic surfactant, or optionally in a non-ionic surfactant to provide, for example, pigment particles having a volume average particle diameter size of, for example, from about 50 nanometers to about 300 nanometers, and from about 125 nanometers to about 200 nanometers. The surfactant used to disperse each colorant can be any number of known components such as, for example, an anionic surfactant like NEOGEN RK™. Known Ultimizer mixing equipment can be used to provide the colorant dispersion, although media mill or other known processes can be utilized.

Toner colorant amounts vary, and can be, for example, from about 1 percent by weight to about 50 percent by weight, from about 2 percent by weight to about 40 percent by weight, from about 2 percent by weight to about 30 percent by weight, from 1 percent by weight to about 25 percent by weight, from 1 percent by weight to about 18 percent by weight, from 1 percent by weight to about 12 percent by weight, from 1 to about 6 percent by weight, or from about 3 percent by weight to about 10 percent by weight of total solids. When magnetite pigments are selected for the toner, the amounts thereof can be up to about 80 percent by weight of solids like from about 40 percent by weight to about 80 percent by weight, or from about 50 percent by weight to about 75 percent by weight, based on the total solids.

Specific toner colorants that may be selected for the disclosed toners include PALIOGEN VIOLET 5100™ and 5890™ (BASF), NORMANDY MAGENTA RD-2400™ (Paul Ulrich), PERMANENT VIOLET VT2645™ (Paul Ulrich), HELIOGEN GREEN L8730™ (BASF), ARGYLE GREEN XP-111-S™ (Paul Ulrich), BRILLIANT GREEN TONER GR 0991™ (Paul Ulrich), LITHOL SCARLET D3700™ (BASF), TOLUIDINE RED™ (Aldrich), Scarlet for THERMOPLAST NSD RED™ (Aldrich), LITHOL RUBINE TONER™ (Paul Ulrich), LITHOL SCARLET 4440™, NBD 3700™ (BASF), BON RED C™ (Dominion Color), ROYAL BRILLIANT RED RD-8192™ (Paul Ulrich), ORACET PINK RF™ (Ciba Geigy), PALIOGEN RED 3340™ and 3871K™ (BASF), LITHOL FAST SCARLET L4300™ (BASF), HELIOGEN BLUE D6840™ D7080™, K7090™, K6910™ and L7020™ (BASF), SUDAN BLUE OS™ (BASF), NEOPEN BLUE FF4012™ (BASF), PV FAST BLUE B2G01™ (American Hoechst), IRGALITE BLUE BCA™ (Ciba Geigy), PALIOGEN BLUE 6470™ (BASF), SUDAN II™, III™ and IV™ (Matheson, Coleman, Bell), SUDAN ORANGE™ (Aldrich), SUDAN ORANGE 220™ (BASF), PALIOGEN ORANGE 3040™ (BASF), ORTHO ORANGE OR 2673™ (Paul Ulrich), PALIOGEN YELLOW 152™ and 1560™ (BASF), LITHOL FAST YELLOW 0991K™ (BASF), PALIOTOL YELLOW 1840™ (BASF), NOVAPERM YELLOW FGL™ (Hoechst), PERMANERIT YELLOW YE 0305™ (Paul Ulrich), LUMOGEN YELLOW D0790™ (BASF), SUCO-GELB 1250™ (BASF), SUCO-YELLOW D1355™ (BASF), SUCO FAST YELLOW D1165™, D1355™ and D1351™ (BASF), HOSTAPERM PINK E™ (Hoechst), FANAL PINK D4830™ (BASF), CINQUASIA MAGENTA™ (DuPont), PALIOGEN BLACK L9984™ (BASF), PIGMENT BLACK K801™ (BASF), and carbon blacks such as REGAL® 330 (Cabot), CARBON BLACK 5250™ and 5750™ (Columbian Chemicals), mixtures thereof, and the like.

Colorant examples include pigments present in water based dispersions, such as those commercially available from Sun Chemical, such as for example, SUNSPERSE BHD 6011™ (Blue 15 Type), SUNSPERSE BHD 9312™ (Pigment Blue 15), SUNSPERSE BHD 6000™ (Pigment Blue 15:3 74160), SUNSPERSE GHD 9600™ and GHD 6004™ (Pigment Green 7 74260), SUNSPERSE QHD 6040™ (Pigment Red 122), SUNSPERSE RHD 9668™ (Pigment Red 185), SUNSPERSE RHD 9365™ and 9504™ (Pigment Red 57), SUNSPERSE YHD 6005™ (Pigment Yellow 83), FLEXIVERSE YFD 4249™ (Pigment Yellow 17), SUNSPERSE YHD 6020™ and 6045™ (Pigment Yellow 74), SUNSPERSE YHD 600™ and 9604™ (Pigment Yellow 14), FLEXIVERSE LFD 4343™ and LFD 9736™ (Pigment Black 7), mixtures thereof, and the like. Water-based colorant dispersions that may be selected for the toner compositions disclosed herein include those commercially available from Clariant, for example, HOSTAFINE Yellow GR™, HOSTAFINE Black T™ and Black TS™, HOSTAFINE Blue B2G™, HOSTAFINE Rubine F6B™ and magenta dry pigment, such as Toner Magenta 6BVP2213 and Toner Magenta EO2, which pigments can be dispersed in water and/or surfactants.

Examples of toner pigments selected and available in the wet cake or concentrated form containing water can be easily dispersed in water utilizing a homogenizer, or simply by stirring, ball milling, attrition, or media milling. In other instances, pigments are available only in a dry form, whereby a dispersion in water is effected by microfluidizing using, for example, a M-110 microfluidizer or an Ultimizer, and passing the pigment dispersion from about 1 to about 10 times through the microfluidizer chamber, or by sonication, such as using a Branson 700 sonicator, or a homogenizer, ball milling, attrition, or media milling with the optional addition of dispersing agents such as ionic or nonionic surfactants.

Specific colorant magnetite examples are Mobay magnetites MO8029™, MO8960™; Columbian magnetites, MAPICO BLACKS™ and surface treated magnetites; Pfizer magnetites CB4799™, CB5300™, CB5600™ MCX6369™; Bayer magnetites, BAYFERROX 8600™, 8610™; Northern Pigments magnetites, NP-604™, NP-608™; Magnox magnetites TMB-100™ or TMB-104™, or mixtures thereof. Colored magnetites, such as mixtures of MAPICO BLACK™ and cyan components, may also be selected as colorants.

Further, specific examples of pigments present in the toner core include phthalocyanine HELIOGEN BLUE L6900™, D6840™, D7080™, D7020™, PYLAM OIL BLUE™, PYLAM OIL YELLOW™, PIGMENT BLUE 1™ available from Paul Ulrich & Company, Inc., PIGMENT VIOLET 1™, PIGMENT RED 48™, LEMON CHROME YELLOW DCC 1026™, E.D. TOLUIDINE RED™ and BON RED C™ available from Dominion Color Corporation, Ltd., Toronto, Ontario, NOVAPERM YELLOW FGL™, HOSTAPERM PINK E™ from Hoechst, and CINQUASIA MAGENTA™ available from E.I. DuPont de Nemours & Company, and the like. Examples of magentas include, for example, 2,9-dimethyl substituted quinacridone and anthraquinone dye identified in the Color Index as CI 60710, CI Dispersed Red 15, diazo dye identified in the Color Index as CI 26050, CI Solvent Red 19, and the like, or mixtures thereof. Illustrative examples of cyans include copper tetra(octadecyl sulfonamide) phthalocyanine, x-copper phthalocyanine pigment listed in the Color Index as CI74160, CI Pigment Blue, and Anthrathrene Blue identified in the Color Index as DI 69810, Special Blue X-2137, and the like, or mixtures thereof. Illustrative examples of yellows that may be selected include diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33 2,5-dimethoxy-4-sulfonanilide phenylazo-4'-chloro-2,4-dimethoxy acetoacetanilide, and Permanent Yellow FGL. The pigment dispersion comprises pigment particles dispersed in an aqueous medium with an anionic dispersant/surfactant or a nonionic dispersant/surfactant, and wherein the dispersant/surfactant amount is, for example, from about 0.5 to about 10 percent by weight.

Shells

The disclosed cores comprised of the components illustrated herein can be encased in at least one shell such as from about 1 shell to about 5 shells, and more specifically, from about 1 shell to about 3 shells, and yet more specifically, from about 1 shell to about 2 shells, of an amorphous resin, a styrene acrylate resin, or mixtures thereof. Each shell can be of a known suitable effective thickness, such as for example, from about 0.2 micron to about 2 microns, or from about 0.5 micron to about 1 micron. Examples of shells are styrene acrylates, copolymers thereof of styrene and an acrylate selected, for example, from the group consisting of ethyl acrylate, ethyl methacrylate, butyl acrylate and butyl methacrylate, and the like, all available from Monsanto Chemicals. Also, the shell can include the compatible core polymers disclosed herein such as terpoly-(propoxylated bisphenol A-terephthalate)-terpoly-(propoxylated bisphenol A-dodecenylsuccinate)-terpoly-(propoxylated bisphenol A-fumarate), and terpoly-(propoxylated bisphenol A-terephthalate)-terpoly-(propoxylated bisphenol A-dodecenylsuccinate)-terpoly-(ethoxylated bisphenol A-terephthalate)-terpoly-(ethoxylated bisphenol A-dodecenylsuccinate)-terpoly-(propoxylated bisphenol A-trimellitate)-terpoly-(ethoxylated bisphenol A-trimellitate). There is formed a shell over, for example, from about 80 percent to about 100 percent of the core, from about 90 percent to about 100 percent of the core, from 85 to about 99 percent of the core, or from about 95 to about 99 percent of the core.

Examples of specific styrene acrylates selected for the disclosed shells include polystyrene-acrylate, polystyrene methacrylate, polystyrene-butadiene, polyacetate, polyacrylate, polymethacrylate polystyrene-2-ethylhexyl acrylate, polystyrene-2-ethylhexyl methacrylate, mixtures thereof, and the like.

The shell resin may be applied to the aggregated, or to the coalesced toner particles by various known methods. An emulsion with the shell components may be combined with the aggregated toner particles so that the shell forms over the aggregated particles. The formation of the shell, or at least one shell, over the aggregated particles may occur while heating to a temperature of from about 30° C. to about 80° C., or from about 35° C. to about 70° C. The formation of the shell may take place over a period of from about 5 minutes to about 10 hours, or from about 10 minutes to about 5 hours. The shell may be present in an amount from about 1 percent by weight to about 80 percent by weight of the toner components, from about 10 percent by weight to about 40 percent by weight of the toner, or from about 20 percent by weight to about 35 percent by weight of the toner.

Additives

A number of known additives can be included in the illustrated herein cold pressure fix toners, such as antioxidants of, for example, IRGANOX® 1010, available from Ciba; NAUGARD® 76, NAUGARD® 445, NAUGARD® 512, NAUGARD® 524, all available from Addivant; MAYZO® BNX® 1425, a calcium salt of phosphonic acid, and MAYZO® BNX® 358 and ETHANOX® 323A, a nonylphenol disulfide available from Mayzo Inc., and which additives can be present in an amount of, for example, from about 0.01 percent by weight to about 25 percent by weight, from about 0.1 to about 25 percent by weight, or from about 1 percent by weight, to about 20 percent by weight of the CPF toner solids.

Further, the CPF toners disclosed herein may further comprise a plasticizer, such as Uniplex 250, commercially available from Unitex, the phthalate ester plasticizers commercially available from Ferro under the trade name SANTICIZER®, such as dioctyl phthalate, diundecyl phthalate, and alkylbenzyl phthalate (SANTICIZER® 278), triphenyl phosphate commercially available from Ferro), KP-140, a tributoxyethyl phosphate commercially available from Great Lakes Chemical Corporation, MORFLEX® 150, a dicyclohexyl phthalate, commercially available from Morflex Chemical Company Inc., trioctyl trimellitate, commercially available from Sigma Aldrich Co., and the like. Plasticizers may be present, for example, in an amount of from about 0.01 percent by weight to about 30 percent by weight, from about 0.1 percent by weight to about 25 percent, or from about 1 percent by weight to about 20 percent by weight of the CPF toner solids.

Toner Preparation

The cold pressure fix toner compositions illustrated herein can be prepared by emulsion aggregation/coalescence methods as described in a number of patents inclusive of, for example, U.S. Pat. Nos. 5,593,807; 5,290,654; 5,308,734; 5,370,963; 6,120,967; 7,029,817; 7,736,832; 8,466,254; 9,428,622 and 9,410,037, the disclosures of each of these patents being totally incorporated herein by reference.

Thus, the disclosed cold pressure fixing toners may be prepared by emulsion/aggregation/coalescence processes, such as a process that includes aggregating a mixture of an optional colorant, an optional wax and optional toner additives, with an emulsion comprising the disclosed co-polyester-co-polydimethylsiloxane, and compatible polymer core, and then coalescing the aggregated mixture. The resin mixture emulsion may be prepared by the known phase inversion process, such as by dissolving the disclosed co-polyester-co-polydimethylsiloxane, compatible amorphous polymer, and optional additives in a suitable solvent, followed by the addition of water like deionized water containing a stabilizer, and optionally a surfactant.

In embodiments, toner compositions may be prepared by a number of the known emulsion/aggregation/coalescent processes, such as a process that includes aggregating a mixture of an optional colorant, an optional wax and optional toner additives, with emulsions comprising a mixture of a co-polyester-co-polydimethylsiloxane and an amorphous resin, and then coalescing the aggregated mixture. The emulsions may be prepared by the known phase inversion process, such as by dissolving the co-polyester-co-polydimethylsiloxane and an amorphous resin in a suitable solvent, followed by the addition of water like deionized water containing a stabilizer, and optionally a surfactant. See in general U.S. Pat. Nos. 9,428,622 and 9,410,037, both of which are incorporated herein in their entirety.

Suitable dissolving solvents include alcohols, ketones, esters, ethers, chlorinated solvents, nitrogen containing solvents, and mixtures thereof. Specific examples of suitable solvents include acetone, methyl acetate, methyl ethyl ketone, tetrahydrofuran, cyclohexanone, ethyl acetate, N,N dimethylformamide, dioctyl phthalate, toluene, xylene, benzene, dimethylsulfoxide, mixtures thereof, and the like. The core resin mixture of the amorphous polyester and the co-polyester-co-polydimethylsiloxane can be dissolved in a solvent at elevated temperature of from about 40° C. to about 80° C., such as from about 50° C. to about 70° C., or from about 60° C. to about 65° C., with the desirable temperature being lower than the glass transition temperature of the wax, when present, or the resin mixture. Thus, the core resin mixture can be dissolved in a solvent at elevated temperatures, but below the boiling point of the solvent, such as at a temperature of from about 2° C. to about 15° C., or from about 5° C. to about 10° C. below the boiling point of the solvent.

Examples of optional suitable stabilizers that are selected for the toner processes illustrated herein include aqueous ammonium hydroxide, water-soluble alkali metal hydroxides, such as sodium hydroxide, potassium hydroxide, lithium hydroxide, beryllium hydroxide, magnesium hydroxide, calcium hydroxide, or barium hydroxide, ammonium hydroxide, alkali metal carbonates, and bicarbonates, such as sodium bicarbonate, lithium bicarbonate, potassium bicarbonate, lithium carbonate, potassium carbonate, sodium carbonate, beryllium carbonate, magnesium carbonate, calcium carbonate, barium carbonate or cesium carbonate, or mixtures thereof. The stabilizer can be present in amounts of, for example, from about 0.1 percent by weight to about 5 percent by weight, from about 0.5 percent by weight to about 3 percent by weight, of the solids of, for example, colorant, wax, and resin mixture. When salts are added as a stabilizer, it may be desirable in embodiments that incompatible metal salts are not present.

Optionally, as disclosed herein a surfactant may be added to the disclosed aqueous emulsion medium to afford additional stabilization for the core resin mixture. Suitable surfactants include anionic, cationic and nonionic surfactants.

Anionic surfactant examples include sodium dodecylsulfate (SDS), sodium dodecyl benzene sulfonate, sodium dodecyl naphthalene sulfate, dialkyl benzenealkyl, sulfates and sulfonates, abitic acid, and the NEOGEN® brand of anionic surfactants. Specific examples of suitable anionic surfactants that may be selected are NEOGEN® R-K available from Daiichi Kogyo Seiyaku Co. Ltd. (Japan), or, TAYCAPOWER® BN2060 available from Tayca Corporation (Japan), which consists primarily of branched sodium dodecyl benzene sulfonate.

Examples of cationic surfactants include dialkyl benzene alkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}$, $C_{15}$, $C_{17}$ trimethyl ammonium bromides, halide salts of quaternized polyoxyethylalkylamines, dodecyl benzyl triethyl ammonium chloride, MIRAPOL® and ALKAQUAT® available from Alkaril Chemical Company, SANISOL® a benzyl dimethyl alkonium chloride, like SANISOL® B-50, available from Kao Chemicals, and the like.

Examples of nonionic surfactants include polyvinyl alcohol, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy)ethanol, available from Rhone-Poulenc Inc. as IGEPAL® CA-210, IGEPAL® CA-520, IGEPAL® CA-720, IGEPAL® CO-890, IGEPAL® CG-720, IGEPAL® CO-290, ANTAROX® 890 and ANTAROX® 897, which consists primarily of alkyl phenol ethoxylate and is available from Rhone-Poulenc Inc.

With further regard to the emulsion/aggregation/coalescence processes, following aggregation, the formed aggregates can be coalesced as illustrated herein. Coalescence may be accomplished by heating the resulting aggregate mixture to a temperature that is about 5° C. to about 30° C. above the glass transition temperature (Tg) of the co-polyester-co-polydimethylsiloxane. Generally, the aggregated mixture is heated to a temperature of from about 50° C. to about 90° C., and where the aggregated mixture may also be stirred at from about 200 revolutions per minute to about 750 revolutions per minute to assist in the coalescent of the particles, and where coalescence may be accomplished over a period of, for example, from about 3 hours to about 9 hours.

Optionally, during coalescence the particle size of the toner particles may be controlled to a desired size by adjusting the pH of the mixture obtained. Generally, to control the particle size, measured by a Coulter Counter, the pH of the formed mixture can be adjusted to from about 5 to about 8 by the addition of a base such as, for example, sodium hydroxide.

After coalescence, the mixture may be cooled to room temperature, from about 20° C. to about 25° C., and the toner particles generated may be washed with water and then dried. Drying may be accomplished by any suitable method including freeze drying, which is usually accomplished at temperatures of about −80° C. for a period of about 72 hours.

Subsequent to aggregation and coalescence, the toner particles in embodiments have an average particle size diameter of from about 1 micron to about 15 microns, from about 4 microns to about 15 microns, or from about 6 microns to about 11 microns, such as about 7 microns as determined by a Coulter Counter. The volume geometric size distribution ($GSD_V$) of the toner particles may be from about 1.20 to about 1.35, and in embodiments less than about 1.25 as determined by a Coulter Counter.

Moreover, in embodiments of the present disclosure a pre-toner mixture can be prepared by combining a colorant, and optionally a wax and other toner components, stabilizer, surfactant, and the disclosed core of a mixture of a co-polyester-co-polydimethylsiloxane, and a compatible amorphous polymer, into an emulsion, or a plurality of emulsions. The pH of the pre-toner mixture can be adjusted to from about 2.5 to about 4 by the addition of an acid such as, for example, acetic acid, nitric acid, or the like. The pre-toner mixture may be optionally homogenized by mixing the mixture at, for example, from about 600 to about 4,000 revolutions per minute with, for example, a TKA ULTRA TURRAX T50 probe homogenizer.

Following the preparation of the pre-toner mixture, an aggregate mixture can be formed by adding an aggregating agent (coagulant) to the pre-toner mixture. The aggregating agent is generally comprised of an aqueous solution of a divalent cation or a multivalent cation material. The aggregating agent may be, for example, polyaluminum halides such as polyaluminum chloride (PAC), or the corresponding bromide, fluoride, or iodide, polyaluminum silicates such as polyaluminum sulfosilicate (PASS), and water soluble metal salts including aluminum chloride, aluminum nitrite, aluminum sulfate, potassium aluminum sulfate, calcium acetate, calcium chloride, calcium nitrite, calcium oxylate, calcium sulfate, magnesium acetate, magnesium nitrate, magnesium sulfate, zinc acetate, zinc nitrate, zinc sulfate, zinc chloride, zinc bromide, magnesium bromide, copper chloride, copper sulfate, and combinations thereof. In embodiments, the aggregating agent may be added to the pre-toner mixture at a temperature that is below the glass transition temperature (Tg) of the emulsion resins. The aggregating agent may be added in an amount of, for example, from about 0.05 to about 3 parts per hundred (pph), or from about 1 to about 10 pph with respect to the weight of toner. The aggregating agent may be added to the pre-toner mixture over a period of, for example, from about 10 to about 60 minutes.

To control aggregation and coalescence of the particles, the aggregating agent can, if desired, be metered into the resin containing mixture selected over a period of time of, for example, at least from about 5 minutes to about 240 minutes, from about 5 minutes to about 200 minutes, from about 10 minutes to about 100 minutes, from about 15 minutes to about 50 minutes, or from about 5 minutes to about 30 minutes. The addition of the aggregating agent can also be performed while the core containing mixture is maintained under stirred conditions of about 50 rpm to about 1,000 rpm, or from about 100 rpm to about 500 rpm, and at a temperature that is below the glass transition temperature of the core resin mixture of, for example, from about 10° C. to about 40° C.

The particles formed can be permitted to aggregate until a predetermined desired particle size is obtained, and where the particle size is monitored during the growth process until the desired, or predetermined particle size is achieved. Composition samples can be removed during the growth process and analyzed, for example, with a Coulter Counter to determine and measure the average particle size. Aggregation can thus proceed by slowly raising the temperature to, for example, from about 35° C. to about 100° C., or from about 35° C. to about 45° C., and retaining the mixture resulting at this temperature for a time period of, for example, from about 0.5 hour to about 6 hours, or from about 1 hour to about 5 hours, while maintaining stirring to provide the aggregated particles.

Once the desired final size of the aggregated toner particles is achieved, the pH of the mixture can be adjusted with a base to a value of from about 6 to about 10, or from about 6.2 to about 7. The adjustment of the pH can be used to freeze, that is to stop toner particle growth. The base used to cease toner growth can include any suitable base, such as alkali metal hydroxides, including sodium hydroxide and potassium hydroxide, ammonium hydroxide, combinations thereof, and the like. In specific embodiments, ethylene diamine tetraacetic acid (EDTA) can be added to help adjust the pH to the desired. In specific embodiments, the base can be added in amounts of from about 2 to about 25 percent by weight of the mixture, and more specifically, from about 4 to about 10 percent by weight of the mixture.

More specifically, in embodiments the cold pressure fix toners of the present disclosure can be prepared by emulsion/aggregation/coalescence by (i) generating, or providing a latex emulsion containing a core of a mixture of the co-polyester-co-polydimethylsiloxane, amorphous polymer, and optional additives, and generating, or providing a colorant dispersion containing colorant, water, and an ionic surfactant, or a nonionic surfactant; (ii) blending the latex emulsions with the colorant dispersion and optional additives, such as a wax; (iii) adding to the resulting blend a coagulant comprising a polymetal ion coagulant, a metal ion coagulant, a polymetal halide coagulant, a metal halide coagulant, or mixtures thereof; (iv) aggregating by heating the resulting mixture below, or about equal to the glass transition temperature (Tg) of the co-polyester-co-polydimethylsiloxane, or in embodiment the amorphous polyester resin to form a core; (v) adding a styrene acrylate shell, or an amorphous resin shell polymer; (vi) introducing a sodium hydroxide solution to increase the pH of the mixture resulting to about 4, followed by the addition of a sequestering agent to partially remove any coagulant metal from the aggregated particles in a controlled manner; (vii) heating the resulting mixture of (vi) about equal to or about above the Tg of the co-polyester-co-polydimethylsiloxane, or the amorphous polyester resin mixture at a pH of from about 7 to about 9; (viii) retaining the heating until the fusion, or coalescence of the resins, wax when present, and colorant are initiated; (ix) changing the pH of the above (viii) mixture by adding an acid to arrive at a pH of from about 6 to about 7.5 thereby accelerating the fusion, or the coalescence, and resulting in toner particles comprised of a core of the amorphous polyester, the co-polyester-co-polydimethylsiloxane, wax when present, and colorant encased in a styrene acrylic shell, or in an amorphous resin shell; and (x) optionally isolating the toner.

Following aggregation to the desired particle size, the particles can then be coalesced to the desired final particle size and shape, the coalescence being achieved by, for example, heating to any desired or effective temperature of, for example, from about 55° C. to about 100° C., from about 75° C. to about 90° C., from about 65° C. to about 75° C., or about 70° C. Coalescence can proceed and be performed over any desired or effective period of time, such as from about 0.1 hour to about 10 hours, from about 0.5 hour to about 8 hours, or about 4 hours.

After coalescence, the above mixture can be cooled to room temperature, typically from about 20° C. to about 25° C. The cooling can be rapid or slow, as desired. A suitable cooling method can include introducing cold water to a jacket around the reactor. After cooling, the toner particles can be optionally washed with water and then dried. Drying can be accomplished by any suitable method for drying including, for example, freeze drying resulting in toner particles possessing a relatively narrow particle size distribution with a lower number ratio geometric standard deviation ($GSD_n$) of from about 1.15 to about 1.40, from about 1.18 to about 1.25, from about 1.20 to about 1.35, or from 1.25 to about 1.35.

The cold pressure fix toner particles prepared in accordance with the present disclosure can, in embodiments, have a volume average diameter as disclosed herein (also referred to as "volume average particle diameter" or "$D50_v$") of from about 1 to about 25, from about 1 to about 15, from about 1 to about 10, or from about 2 to about 5 microns. $D50_v$, $GSD_v$, and $GSD_n$ can be determined by using a measuring instrument, such as a Beckman Coulter Multisizer 3, operated in accordance with the manufacturer's instructions. Representative sampling can occur as follows. A small amount of toner sample, about 1 gram, can be selected and filtered through a 25 micrometer screen, then placed in isotonic solution to obtain a concentration of about 10 percent, with the sample then being subjected to a Beckman Coulter Multisizer 3.

The disclosed toner particles can have a shape factor of from about 105 to about 170, or from about 110 to about 160, SF1*a. Scanning electron microscopy (SEM) can be used to obtain the shape factor analysis of the toners by SEM and image analysis (IA). The average particle shapes are quantified by employing the following shape factor ($SF1^*a=100d2/(4A)$), where A is the area of the particle and d is its major axis. A perfectly circular or spherical particle has a shape factor of exactly 100. The shape factor SF1* increases as the shape becomes more irregular or elongated in shape with a higher surface area.

Toner Additives

Various suitable surface additives may be selected for the disclosed cold pressure fix toner compositions. Examples of additives are surface treated fumed silicas of, for example, TS-530® obtainable from Cabosil Corporation, with an 8 nanometer particle size and a surface treated hexamethyldisilazane, NAX50® silica, obtained from DeGussa/Nippon Aerosil Corporation, coated with HMDS, DTMS® silica, obtained from Cabot Corporation, and comprised of a fumed silica silicon dioxide core L90 coated with DTMS; H2050EP®, obtained from Wacker Chemie, coated with an amino functionalized organopolysiloxane, metal oxides such as $TiO_2$ of, for example, MT-3103®, available from Tayca Corporation, with a 16 nanometer particle size and a surface treatment of decylsilane, SMT5103®, obtainable from Tayca Corporation, a crystalline titanium dioxide core MT500B coated with DTMS; P-25®, obtainable from Degussa Chemicals, with no surface treatment; metal oxides such as aluminum oxide, and as a lubricating agent stearates, or long chain alcohols, such as UNXLIN 700®, and the like. In general, silica is applied to the toner surface for toner flow, triboelectric enhancement, admix control, improved development and transfer stability, and higher toner blocking temperatures. $TiO_2$ is added for improved relative humidity (RH) stability, tribo control, and improved development and transfer stability.

The surface additives of silicon oxides and titanium oxides, which should more specifically possess a primary particle size greater than approximately 30 nanometers, or at least 40 nanometers, with the primary particles size being measured by, for instance, transmission electron microscopy (TEM), or calculated (assuming spherical particles) from a measurement of the gas absorption, or BET surface area, are applied to the toner surface with the total coverage of the toner ranging from, for example, about 140 to about 200 percent theoretical surface area coverage (SAC), where the theoretical SAC is calculated assuming all toner particles are spherical and have a diameter equal to the volume median diameter of the toner as measured in the standard Coulter Counter method, and that the additive particles are distributed as primary particles on the toner surface in a hexagonal close packed structure. Another metric relating to the amount and size of the additives is the sum of the SAC multiplied by size (surface area coverage times the primary particle size of the additive in nanometers) for each of the silica and titania particles. The ratio of the silica to titania particles is generally from about 50 percent silica/50 percent titania to about 85 percent silica/15 percent titania (on a weight percentage basis).

Calcium stearate, zinc stearate, or mixtures thereof in amounts, for example, of from about 0.1 percent by weight to about 4 weight percent can be selected as toner additives to primarily provide for excellent toner lubricating properties, improved developer conductivity and triboelectric charge enhancement, higher toner charge and charge stability by increasing the number of contacts between the toner and carrier particles. Examples of selected toner surface additive stearates are SYNPRO®, Calcium Stearate 392A and SYNPRO®, Calcium Stearate NF Vegetable, or Zinc Stearate-L.

For the disclosed cold pressure fix toners, it may be desirable to have the toner material flow near room temperature under a selected applied pressure of the cold pressure fixing system to thus enable the toner to flow over the substrate surface and into pores, or fibers in the substrate, and to allow the toner particles to flow into each other, thus providing a smooth continuous toner layer that is effectively adhered to a substrate, such as paper. The disclosed cold pressure fix toner flow can be measured utilizing the CFT-500D Flowtester™, available from Shimadzu Corporation. Also, it may be desirable that the pressure applied to the disclosed cold pressure fix toners be relatively low, such as about 100 $kgf/cm^2$ (kilograms per square centimeter pressure unit; about 1,423 psi). However, in embodiments the pressure can be higher, up to for example, about 400 $kgf/cm^2$, with heat being applied to preheat the toner, or the substrate, such as paper, prior to entry of the toner into the cold pressure fixing system.

Developer Compositions

Also encompassed by the present disclosure are developer compositions comprised of the toners illustrated herein and carrier particles.

Examples of carrier particles suitable for mixing with the disclosed cold pressure fix toner compositions include those particles that are capable of triboelectrically obtaining a charge of opposite polarity to that of the toner particles, such as granular zircon, granular silicon, glass, steel, nickel, ferrites, iron ferrites, silicon dioxide, and the like. The selected carrier particles can be used with or without a coating, the coating generally being comprised of fluoropolymers, such as polyvinylidene fluoride resins, terpolymers of styrene, methyl methacrylates, silanes, such as triethoxy silane, tetrafluoroethylenes, other known coatings, and the like.

In applications in which the described CPF toners are used with an image-developing device employing roll fusing, the carrier core may be at least partially coated with a polymethyl methacrylate (PMMA) polymer, commercially available from Soken Chemicals, and having a weight-average molecular weight of from about 300,000 to about 350,000. PMMA is an electropositive polymer that will generally impart a negative charge on the disclosed cold pressure fix toner. The carrier coating can be, for example, from about 0.1 percent by weight to about 5 percent by weight, or from about 0.5 percent by weight to about 2 percent by weight of the carrier. The PMMA may optionally be copolymerized with various known commoners, such as monoalkyl, or dialkylamines like dimethylaminoethylmethacrylates, diethylaminoethylmethacrylates, diisopropylaminoethylmethacrylates, tert-butylaminoethyl methacrylates, and mixtures thereof.

Carrier particles can be mixed with the disclosed cold pressure fix toner particles in any suitable combination, such as, for example, where from about 1 part to about 5 parts by weight of toner particles are mixed with from about 10 parts to about 300 parts by weight of the toner particles.

The present disclosure also provides a method of developing a latent xerographic image comprising applying the disclosed cold pressure fix toner to an imaged photoconductor, transferring the resulting developed image to a suitable substrate like paper, and fusing the toner to the substrate by exposing the toner to pressure.

Specific embodiments will now be described in detail. These examples are intended to be illustrative, and are not limited to the materials, conditions, or process parameters set forth therein. All parts are percentages by solid weight unless otherwise indicated, and the particle sizes were measured with a Multisizer 3® Coulter Counter available from Beckman Coulter.

EXAMPLE I

There was prepared the crystalline copoly-(ethylene dodecanoate)-copoly-(3-propyl-dimethylsiloxane) resin, Resin A, derived from ethylene glycol, dodecanedioic acid and carbinol (hydroxyl) terminated polydimethylsiloxane as follows.

In a 2-liter Buchi reactor there were charged 675.7 grams of dodecanedioic acid, 200 grams of ethylene glycol and 250 grams of carbinol terminated polydimethylsiloxane available from Gelest Inc. as DMS-16, with a viscosity of about 50 to about 65 centistokes, and 1 gram of FASCAT® 4100, a butylstannoic acid catalyst available from Elf Atochem. The resulting mixture was slowly heated to 225° C. over a three hour period, and then maintained at 225° C. for an additional five hours. The resin obtained was then discharged into a metal container and left to solidify at room temperature, 20° C. to 25° C. resulting in the following crystalline copoly-(ethylene dodecanoate)-copoly-(3-propyl-dimethylsiloxane) resin wherein m is 10, n is 2, $R_1$ and $R_2$ are methyl, the a segment is about 75 percent of the resin, and the b segment is about 25 percent of the resin.

The melting point temperature ($T_m$) of 77.9° C., recrystallization temperature ($T_c$) of 55.5° C., and heat of fusion of 66 joules per gram for the above prepared resin was measured with the DuPont 910 Differential Scanning Calorimetry. The above prepared resin weight average molecular weight was 18.4 kilo (k) Daltons as measured with a Waters® ACQUITY® Advanced Polymer Chromatography™ (APC™) System using polystyrene standards, and the above prepared resin number average molecular weight was 7.8 kilo Daltons as measured with a Waters® ACQUITY® Advanced Polymer Chromatography™ (APC™) System using polystyrene standards. See Table 1 that follows.

An emulsion of the above prepared crystalline resin was generated by dissolving 100 grams of this resin in 100 grams of methyl ethyl ketone and 3 grams of isopropanol. The mixture obtained was then heated to 40° C. with stirring, and to the resulting mixture there were added dropwise 5.5 grams (10 percent aqueous solution) of ammonium hydroxide, after which 200 grams of water were added dropwise over a 30 minute period. The resulting dispersion was then heated to 80° C., and the methyl ethyl ketone was removed by distillation to result in a 38.03 percent by weight of the crystalline copoly-(ethylene dodecanoate)-copoly-(3-propyl-dimethylsiloxane) resin, Resin A, dispersed in water. The crystalline copoly-(ethylene dodecanoate)-copoly-(3-propyl-dimethylsiloxane) resin emulsion particles were measured to be 165 nanometers in size diameter as determined by the Nanotrac® U2275E particle size analyzer.

EXAMPLE II

There was prepared the crystalline copoly-(nonylene-dodecanoate)-copoly-(3-propyl-dimethylsiloxane) resin, Resin B, derived from 1,9-nonanediol, dodecanedioic acid and carbinol (hydroxyl) terminated polydimethylsiloxane as follows.

In a 2-liter Buchi reactor there were charged 564 grams of dodecanedioic acid, 375.8 grams of 1,9-nonanediol, and 150 grams of carbinol terminated polydimethylsiloxane, available from Gelest as DMS-16, Inc., with a viscosity of about 50 to about 65 centistokes, and 1 gram of FASCAT® 4100, a butylstannoic acid catalyst available from Elf Atochem. The resulting mixture was slowly heated to 225° C. over a three hour period, and then maintained at 225° C. for an additional five hours. The resin resulting was then discharged into a metal container and left to solidify at room temperature to result in 35 percent by weight of the following crystalline copoly-(nonylene-dodecanoate)-copoly-(3-propyl-dimethylsiloxane), Resin B, wherein m is equal to 10, n is equal to 9, $R_1$ and $R_2$ are methyl, and where a and b represent the random segments of the resin, and where the a segment is about 85 percent of the resin and the b segment is about 15 percent of the resin.

The above prepared crystalline copoly-(nonylene-dodecanoate)-copoly-(3-propyl-dimethylsiloxane) resin melting point temperature ($T_m$) was 77.1° C., the re-crystallization temperature ($T_c$) was 54.8° C., and the heat of fusion was 105 joules per gram, all determined by the DuPont 910 Differential Scanning Calorimetry. The weight average molecular weight of this resin was 23.6 kilo Daltons as determined with a Waters® ACQUITY® Advanced Polymer Chromatography™ (APC™) System, and using polystyrene standards, and the number average molecular weight of this resin was 13.6 kilo Daltons as determined with a Waters® ACQUITY® Advanced Polymer Chromatography™ (APC™) System and using polystyrene standards. See Table 1 that follows.

An emulsion of the above prepared crystalline Resin B was prepared by dissolving 100 grams of this resin in 100 grams of methyl ethyl ketone and 3 grams of isopropanol. The mixture obtained was then heated to 40° C. with stirring, and to this mixture were added dropwise 5.5 grams of ammonium hydroxide (10 percent aqueous solution), after which 200 grams of water were added dropwise over a 30 minute period. The resulting dispersion was then heated to 80° C., and the methyl ethyl ketone was removed by distillation to result in a 35 percent by weight of the crystalline copoly-(nonylene-dodecanoate)-copoly-(3-propyl-dimethylsiloxane), Resin B, in water.

The crystalline co-polyester copoly-(nonylene-dodecanoate)-copoly-(3-propyl-dimethylsiloxane) emulsion particles were measured to be 171 nanometers in size diameter using the Nanotrac® U2275E particle size analyzer.

heating to 230° C. over a two to three hour period, and maintained for an additional 8 hours at 230° C. to 235° C. under nitrogen. During this time, water was collected in the distillation receiver. The resulting mixture was then heated at 225° C., and a vacuum was applied (2 to 3 millimeters of Hg) for 6 hours, after which an acid value of 4.19 milligrams/gram KOH was obtained with a softening point for the solids of 101.4° C. The obtained mixture was then heated at 190° C., and then there was added fumaric acid (16.7 grams, 3.9 percent by weight) and hydroquinone (0.5 gram), followed by heating to 203° C. over a three hour period, and applying a vacuum for another three hours until a softening point of 120.2° C. with an acid value of 14.2 milligrams/gram KOH was achieved. The reaction product, terpoly-(propoxylated bisphenol A-terephthalate)-terpoly-(propoxylated bisphenol A-dodecenylsuccinate)-terpoly-(propoxylated bisphenol A-fumarate)-(propoxylated bisphenol A-trimellitate) resin was then discharged into a container, and allowed to cool to room temperature. A glass transition temperature (Tg) of 59.4° C. was obtained for this resin as determined by the DuPont 910 Differential Scanning Calorimetry. The weight average molecular weight of this resin was 19.7 kilo (k) Daltons using polystyrene standards, and the number average molecular weight was 4.67 kilo Daltons as measured with a Waters® ACQUITY® Advanced Polymer Chromatography™ (APC™) System and using polystyrene standards.

An emulsion of the above prepared amorphous polyester resin of terpoly-(propoxylated bisphenol A-terephthalate)-terpoly-(propoxylated bisphenol A-dodecenylsuccinate)-terpoly-(propoxylated bisphenol A-fumarate)-(propoxylated bisphenol A-trimellitate), Resin C, derived from propoxylated bisphenol A, terephthalic acid, dodecenylsuccinic acid,

TABLE 1

| Resin | Acid Value (mg KOH/g) | Viscosity (poise) | $M_n$ K Daltons | $M_w$ K Daltons | Melting Point (° C.) | Re-Crystallization Point (° C.) | Heat of Fusion Joules/g |
|---|---|---|---|---|---|---|---|
| A | 12.0 | 18.3 | 7.8 | 18.4 | 77.9 | 55.5 | 66 |
| B | 15.4 | 38.4 | 13.6 | 23.6 | 71.1 | 54.8 | 105 |

EXAMPLE III

There was prepared an amorphous polyester resin of terpoly-(propoxylated bisphenol A-terephthalate)-terpoly-(propoxylated bisphenol A-dodecenylsuccinate)-terpoly-(propoxylated bisphenol A-fumarate)-(propoxylated bisphenol A-trimellitate), Resin C, derived from propoxylated bisphenol A, terephthalic acid, dodecenylsuccinic acid, and fumaric acid as follows.

To a 1 liter Buchi reactor equipped with a mechanical stirrer, bottom drain valve, and distillation apparatus, there was charged propoxylated bisphenol A (433.8 grams, 53.25 percent by weight), terephthalic acid (109.4 grams, 23.4 percent by weight), dodecenyl succinic anhydride (DDSA) (100.5 grams, 16 percent by weight), trimellitic anhydride (9.5 grams, 2.33 percent by weight) and the catalyst FAS-CAT® 4100, a butylstannoic acid (2.5 grams), followed by and fumaric acid resin was generated by dissolving 100 grams of this resin in 100 grams of methyl ethyl ketone and 3 grams of isopropanol. The mixture obtained was then heated to 40° C. with stirring, and to this mixture were added dropwise 5.5 grams of ammonium hydroxide (10 percent aqueous solution) after which 200 grams of water were added dropwise over a 30 minute period. The resulting dispersion was then heated to 80° C., and the methyl ethyl ketone was removed by distillation to result in a dispersion of the amorphous polyester resin of terpoly-(propoxylated bisphenol A-terephthalate)-terpoly-(propoxylated bisphenol A-dodecenylsuccinate)-terpoly-(propoxylated bisphenol A-fumarate)-(propoxylated bisphenol A-trimellitate), Resin C, in water. The obtained amorphous polyester emulsion particles were measured to be 155 nanometers in size diameter using the Nanotrac® U2275E particle size analyzer.

EXAMPLE IV

There was prepared an amorphous poly(styrene-acrylate) resin, Resin D, comprised of polymer particles generated from the emulsion polymerization of 81 percent by weight of styrene, 19 percent by weight of n-butyl acrylate, and 1.5 percent by weight of beta-carboxyethyl acrylate (β-CEA) as follows.

Calfax Surfactant Solution Preparation: A surfactant solution of 0.334 kilogram of CALFAX® DB-45 (the anionic emulsifier sodium dodecyl diphenyl oxide disulfonate, 45 percent active, available from Pilot Chemical Company), and 87.23 kilograms of deionized water were charged into a stainless steel 100 gallon capacity reactor and mixed at 110 rpm. The reactor was equipped with a condenser and purged with nitrogen at 10 standard cubic feet per hour while being heated up to 75° C. at a controlled rate and held there.

Emulsified Monomer Preparation: Separately in 45 gallon plastic drum, 1.89 kilograms of CALFAX® DB-45 and 46.73 kilograms of deionized water were mixed together resulting in a surfactant solution. Separately in a 50 gallon capacity reactor, the monomer emulsion was prepared by mixing 81.1 kilograms of styrene, 19.02 kilograms of butyl acrylate, 1.05 kilograms of β-CEA, 1.37 kilograms of 1-dodecanethiol (DDT), and 0.350 kilogram of 1,10-decanediol diacrylate (ADOD). The resulting surfactant solution was then transferred to the 50 gallon capacity reactor containing the above prepared monomer emulsion while being stirred at 150 rpm. The surfactant solution and monomer emulsion were mixed for 5 minutes followed by no mixing for 3 minutes; this mixing/sitting was repeated two times to create an emulsified aqueous monomer solution.

Separately in a 5 gallon pail, 1.50 kilograms of ammonium persulfate initiator were dissolved in 13.91 kilograms of deionized water.

Into the above reactor containing the heated CALFAX® surfactant solution there were added 7.60 kilograms (5 percent seed) of the above prepared emulsified aqueous monomer solution to form seeds. After 20 minutes, the ammonium persulfate initiator solution addition was started and charged into the reactor over 23.5 minutes, followed by adding 1 kilogram of deionized water.

Monomer Feed Reaction: After 20 minutes, the remaining monomer emulsion was added into a 100 gallon reactor over two aliquots of Feed #1 and Feed #2. Feed #1 was added into the reactor over 120 minutes and equated to 72.2 killigrams of emulsified monomer followed by the addition of 1.2 killigrams of deionized water (chaser). To the remaining monomer emulsion (Feed #2) was added 0.63 killigram 1-dodecanethiol (DDT) and fed into the reactor over 90 minutes. At this point the rpm was increased to 120 and an extra 2.3 killigrams of deionized water were added to the reactor to clear the emulsified monomer from pump lines. The reactor was held at 75° C. for 60 minutes. The condenser was turned off after 1 hour post reaction while still at 75° C., and excess monomer was allowed to blow out of the reactor for 120 minutes before cooling it to room temperature.

The above resulting white non-viscous liquid was then discharged into two closed head plastic drums once the temperature plateaued to room temperature. The particle size was then measured by the Nanotrac® U2275E particle size analyzer. Narrow particle size was achieved with a particle size of 188 nanometers±60 nanometers. A glass transition temperature (Tg) of 55.3° C. was obtained after drying a sample in a freeze drier, and evaluated using the DuPont 910 Differential Scanning Calorimetry. A weight average molecular weight of 24.5 kilo Daltons was measured with a Waters® ACQUITY® Advanced Polymer Chromatography™ (APC™) System using polystyrene standards and a number average molecular weight of 8.97 kilo Daltons was measured with a Waters® ACQUITY® Advanced Polymer Chromatography™ (APC™) System and using polystyrene standards. The resulting poly(styrene-acrylate) resin latex, Resin D, was obtained as an aqueous dispersion comprised of 40.75 percent by weight in water.

EXAMPLE V

There was prepared a cyan cold pressure fixing toner that contained in a core the above prepared Example II crystalline copoly-(nonylene-dodecanoate)-copoly-(3-propyl-dimethylsiloxane) resin, Resin B (35 percent by weight of total resin), and the above prepared Example III amorphous polyester resin of A-terephthalate)-terpoly-(propoxylated bisphenol A-dodecenylsuccinate)-terpoly-(propoxylated bisphenol A-fumarate)-(propoxylated bisphenol A-trimellitate), derived from propoxylated bisphenol A, terephthalic acid, dodecenylsuccinic acid and fumaric acid, Resin C, 35 percent by weight of total resin, and a shell thereover comprised of the above prepared Example IV amorphous poly(styrene-acrylate) resin, Resin D, 30 percent by weight of total resin.

Into a 2 liter glass reactor equipped with an overhead stirrer were added 39.26 grams of PB15:3 dispersion (15.27 percent by weight), 89.41 grams of the crystalline copoly-(nonylene-dodecanoate)-copoly-(3-propyl-dimethylsiloxane), Resin B, and 84.80 grams of terpoly-(propoxylated bisphenol A-terephthalate)-terpoly-(propoxylated bisphenol A-dodecenylsuccinate)-terpoly-(propoxylated bisphenol A-fumarate)-(propoxylated bisphenol A-trimellitate), Resin C. The pH of the resulting mixture was adjusted to 3.14 by the addition of a 0.3 Molar aqueous nitic acid solution, and then homogenized at 4,000 rpm using an IKA Ultra Turrax mixer. To the mixture obtained there were added dropwise 23.89 grams of an aluminum sulfate solution with continued homogenization. After homogenization, the resulting mixture was stirred at 200 rpm, and heated from room temperature to 47° C. at a rate of 1° C. per minute. The particle size was monitored with the Coulter Counter™ analyzer until the core particles reached a volume average particle size of 5.36 microns (m). Then, 74.36 grams of the amorphous styrene acrylate, Resin D, latex were added as a shell material, resulting in core shell structured particles with an average size of 6.34 microns. Thereafter, the pH of the reaction slurry was increased to 7.8 using 2.37 grams of EDTA (39 percent by weight in water) to freeze the toner growth. After freezing, the reaction mixture was heated to 70° C. and the pH of the mixture was decreased to 6 by the addition of 29.39 grams of 0.3 molar aqueous nitric acid solution. The reaction temperature was then increased to 75° C. and maintained at this temperature for a total of 90 minutes to attain coalescence followed by cooling to room temperature, separated by sieving (25 μm, filter), washing, and freeze dried. The resulting core shell toner displayed a final particle size of 6.08 microns, a geometric size distribution (GSD) of 1.20 (volume) and 1.22 (number), and a circularity of 0.975.

There was prepared a number of cyan cold pressure fixing toners following the procedure of Example V, and wherein the resin composition of both the core and shell were varied as illustrated in Table 2, where the particle size were measured with a Coulter Counter, the GSD v/n was determined by a Coulter Counter or, by using a measuring instrument, such as measured with a Multisizer 3® Coulter Counter, available from Beckman Coulter, and the circularity was measured with a Multisizer 3® Coulter Counter, available from Beckman Coulter.

TABLE 2

| Toner Example | Toner Composition (%) | | | | | Partial Size (microns) | GSD (v/n) | Circularity |
|---|---|---|---|---|---|---|---|---|
| | Core | | | Shell | | | | |
| | Resin A | Resin B | Resin C | Resin C | Resin D | | | |
| V | — | 35 | 35 | — | 30 | 6.08 | 1.20/1.22 | 0.975 |
| VI | — | 52.5 | 52.5 | — | 30 | 6.61 | 1.24/1.27 | 0.954 |
| VII | 35 | — | 35 | — | 30 | 7.49 | 1.22/1.27 | 0.963 |
| VIII | 52.5 | — | 52.5 | — | 30 | 6.14 | 1.24/1.34 | 0.918 |
| IX | 35 | — | 35 | 30 | — | 7.65 | 1.26/1.31 | 0.899 |
| X | 49 | — | 49 | 30 | — | 7.11 | 1.23/1.41 | 0.873 |
| XI | 42.5 | — | 42.5 | — | 15 | 6.02 | 1.26/1.25 | 0.909 |
| XII | 63.8 | — | 63.8 | — | 15 | 5.77 | 1.28/1.42 | 0.969 |
| XIII | 67.5 | — | 67.5 | — | 10 | 13.19 | 1.35/1.90 | NA |
| XIV | 45 | — | 45 | — | 10 | 6.08 | 1.27/1.32 | 0.974 |
| XV | — | 35 | 35 | 30 | — | 7.04 | 1.26/1.74 | 0.960 |

Cold Pressure Fixing

A laboratory cold pressure fixture was utilized with a process speed of 243 mm/s, a variable nip pressure load area of 1,000 PSI (6.9 MPa, Mega Pascals) and 1,500 PSI (10.3 MPa), and with a roll contact length of 70 mm. The pressure was maintained at a constant 5 Kg/cm² (82 lb./inch²). Toner Images on paper were generated using the Xerox Corporation 800 printer with the fusing fixture disabled. The obtained unfused prints were then subjected to the above laboratory cold pressure fixture. Image permanence was then evaluated using the Taber Linear Abraser (Model 5700) with a commercially available Crock cloth attachment. The images were rubbed 10 cycles per minute, and then 60 cycles per minute. All of the above Table 2 toners displayed excellent toner fix to paper and none to minimal removal of toner images onto the Crock cloth during the Taber Linear Abraser (Model 5700) test.

Figure 1:
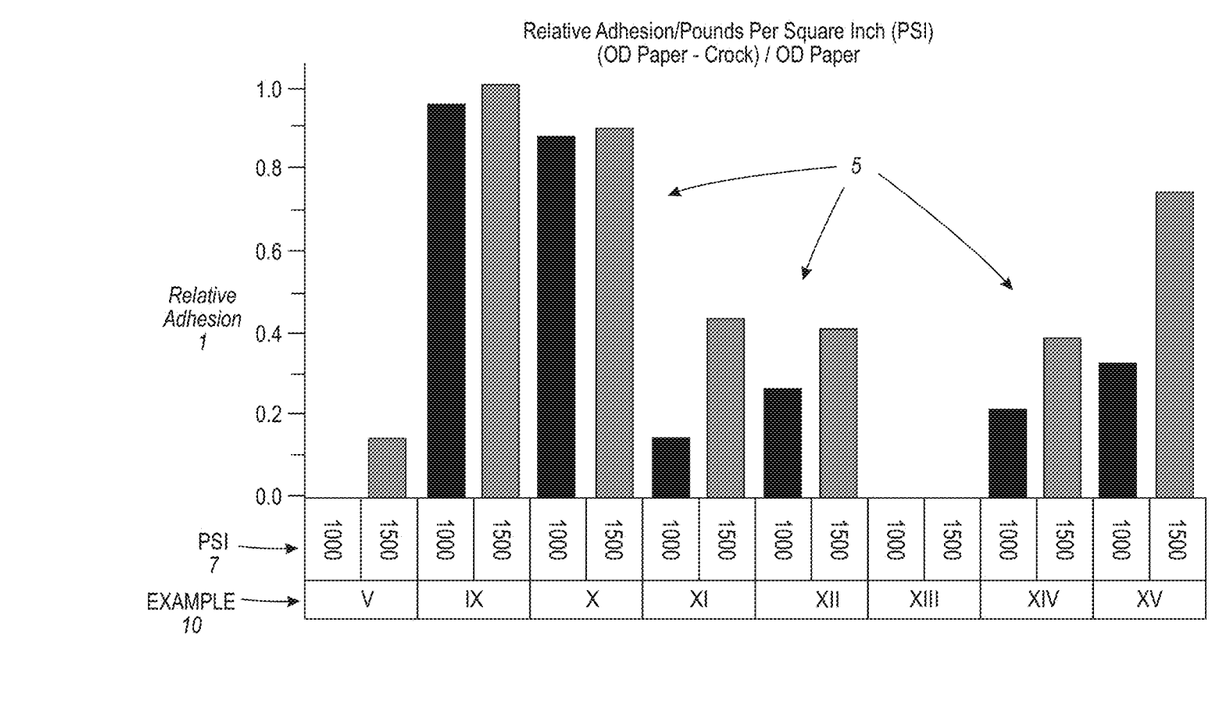

Cold pressure fix performance of the above prepared Table 2 toners were evaluated by directing unfused images generated using a modified Adirondack Machine Corporation pressure apparatus, which has two metal rolls (78 mm in diameter), and where the top roll has been coated with TEFLON® and machined so that the width of the high pressure zone is 70 mm, through the nip of a metal roller system. The process speed of the cold pressure fix apparatus was set to 240 mm/s and the load between the two rolls was applied by compressing metal springs to obtain the desired nip pressure. Two variable nip pressure load areas of 1,000 PSI (6.9 MPa) and 1,500 PSI (10.3 MPa) were applied for each toner sample. The unfused prints were then subjected to the above cold pressure fixture, and image permanence was then evaluated by the Taber standard rub fix procedures. The half-tone pattern on the fused print was rubbed using a Taber Linear Abrader to which a Crock cloth had been attached. A 500 gram load was used during the test with two cycles of rubbing the pattern. After the physical rubbing of the pattern, the Crock cloth was removed from the Taber Linear abrader and the average optical density of the toner that had transferred to the cloth was measured with a Gretag/Macbeth Transmission Densitometer. The fix of the images was then ranked on a scale of 1 to 5 (black bar was at 1,000 psi; red bar was at 1,500 psi) with 1 representing poor fix, and 5 representing excellent fix. See FIG. 1 which is a bar graph presenting relative adhesion values of select samples.

Additionally, Pen Offset, which refers to images that offsets to another page when the image is pressed with a pen, performance of a number of the Table 2 cold pressure fix toners was accomplished and there resulted the following Table 3 data with the higher values representing better Pen Offset.

Pen Offset to determine the adhesion of the toners to paper was then completed for each of the test prints that were separately placed face down on top of a blank section of Xerox Corporation Bold paper. The amount of toner that was transferred from the print to the blank paper indicates how well toner was attached to the page. A 6 mm diameter stainless steel ball attached to a holder was placed in contact with the back side of the test print while a load was applied. Three different loads were used (1N, 2N and 5N, Newton unit of force) over a 40 mm length and 20 mm/s. For purposes of the test, a CSM Tribometer available from Rtec Instruments was used.

TABLE 3

| Toner Example | Pen Offset |
|---|---|
| XII | 2.0 |
| XIII | 2.5 |
| IX | 4.7 |
| X | 3.0 |
| XI | 2.0 |
| XV | 2.0 |

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

What is claimed is:

1. A cold pressure fix toner composition comprising a core comprising a colorant, a crystalline co-polyester-co-polydimethylsiloxane resin and an amorphous resin, and a polymer shell thereover.

2. A toner in accordance with claim 1 wherein said crystalline co-polyester-co-polydimethylsiloxane resin is copoly-(ethylene dodecanoate)-copoly-(3-propyl-dimethylsiloxane).

3. A toner in accordance with claim 1 wherein said crystalline co-polyester-co-polydimethylsiloxane resin is selected from the group consisting of copoly(hexylene dodecanoate)-copoly-(3-propyl-dimethylsiloxane), copoly(butylene dodecanoate)-copoly-(3-propyl-dimethylsiloxane), copoly-(ethylene sebacate)-copoly-(3-propyl-dimethylsiloxane), copoly-(butylene sebacate)-copoly-(3-propyl-dimethylsiloxane), copoly-(butylene decanoate)-copoly-(3-propyl-dimethylsiloxane), copoly-(ethylene dodecanoate)-copoly-(3-propyl-dimethylsiloxane), and a copoly-(nonylene dodecanoate)-copoly-(3-propyl-dimethylsiloxane).

4. A toner in accordance with claim 1 wherein said amorphous resin is selected from the group consisting of terpoly-(propoxylated bisphenol A-terephthalate)-terpoly-(propoxylated bisphenol A-dodecenylsuccinate)-terpoly-(propoxylated bisphenol A-fumarate), terpoly-(propoxylated bisphenol A-terephthalate)-terpoly-(propoxylated bisphenol A-dodecenylsuccinate)-terpoly-(ethoxylated bisphenol A-terephthalate)-terpoly-(ethoxylated bisphenol A-dodecenylsuccinate)-terpoly-(propoxylated bisphenol A-trimellitate)-terpoly-(ethoxylated bisphenol A-trimellitate), poly(propoxylated bisphenol A-co-fumarate), copoly (propoxylated bisphenol-fumarate)-copoly(trimethylol propoxylated-bisphenol-fumarate), copoly(ethoxylated bisphenol-fumarate)-copoly(trimethylolpropoxylated-bisphenol-fumarate), and copoly(butoxylated bisphenol-fumarate)-copoly(trimethylol propoxylated-bisphenol-fumarate).

5. A toner in accordance with claim 1 wherein said amorphous resin is a terpoly-(propoxylated bisphenol A-terephthalate)-terpoly-(propoxylated bisphenol A-dodecenylsuccinate)-terpoly-(propoxylated bisphenol A-fumarate).

6. A toner in accordance with claim 1 wherein said crystalline co-polyester-co-polydimethylsiloxane resin is present in an amount of from about 10 percent by weight to about 75 percent by weight of the toner, and said amorphous resin is present in an amount of from about 25 percent by weight to about 50 percent by weight of the toner.

7. A toner in accordance with claim 1 wherein said polymer shell is comprised of an amorphous resin selected from the group consisting of amorphous resins of terpoly-(propoxylated bisphenol A-terephthalate)-terpoly-(propoxylated bisphenol A-dodecenylsuccinate)-terpoly-(propoxylated bisphenol A-fumarate), copoly-(propoxylated bisphenol A-terephthalate)-copoly-(propoxylated bisphenol A-dodecenylsuccinate)-copoly-(ethoxylated bisphenol A-terephthalate)-copoly-(ethoxylated bisphenol A-dodecenylsuccinate)-copoly-(propoxylated bisphenol A-trimellitate)-copoly-(ethoxylated bisphenol A-trimellitate), poly(propoxylated bisphenol A-co-fumarate), copoly(propoxylated bisphenol-fumarate)-copoly(trimethylol propoxylated-bisphenol-fumarate), copoly(ethoxylated bisphenol-fumarate)-copoly(trimethylolpropoxylated-bisphenol-fumarate), terpoly-(propoxylated bisphenol A-terephthalate)-terpoly-(propoxylated bisphenol A-dodecenylsuccinate)-terpoly-(propoxylated bisphenol A-fumarate)-(propoxylated bisphenol A-trimellitate), and copoly(propoxylated 1,4-diphenol-fumarate)-copoly(glycerinoxylated-diphenol-fumarate).

8. A toner in accordance with claim 1 wherein said polymer shell is comprised of a polystyrene acrylate amorphous resin.

9. A toner in accordance with claim 1 wherein said polymer shell is derived from styrene monomers or, acrylate monomers selected from the group consisting of polystyrene-acrylate, polystyrene methacrylate, polystyrene-butadiene, polyacrylate, polymethacrylate, polystyrene-2-ethylhexyl acrylate, polystyrene-2-ethylhexyl methacrylate, and mixtures thereof.

10. A toner in accordance with claim 1 wherein said shell encompasses from about 10 weight percent to about weight 40 percent of the toner.

11. A toner in accordance with claim 1 wherein said colorant is selected from at least one of carbon black, cyan, magenta, yellow, and mixtures thereof.

12. A toner in accordance with claim 1 further containing a wax.

13. A toner in accordance with claim 12 wherein said wax is polyethylene, polypropylene, or mixtures thereof, and wherein said wax is present in an amount of from about 1 to about 10 percent of the solids.

14. A cold pressure fix toner comprising a core comprising a colorant, wax, optional additives, and a mixture of a co-polyester-co-polydimethylsiloxane and an amorphous resin, and a shell thereover comprised of a polymer, and wherein said co-polyester-co-polydimethylsiloxane is selected from the group consisting of copoly(hexylene dodecanoate)-copoly-(3-propyl-dimethylsiloxane), copoly(butylene dodecanoate)-copoly-(3-propyl-dimethylsiloxane), copoly-(ethylene sebacate)-copoly-(3-propyl-dimethylsiloxane), copoly-(butylene sebacate)-copoly-(3-propyl-dimethylsiloxane), copoly-(butylene decanoate)-copoly-(3-propyl-dimethylsiloxane), copoly-(ethylene dodecanoate)-copoly-(3-propyl-dimethylsiloxane), and a copoly-(nonylene dodecanoate)-copoly-(3-propyl-dimethylsiloxane).

15. A cold pressure fix toner in accordance with claim 14 wherein said amorphous resin is selected from the group consisting of terpoly-(propoxylated bisphenol A-terephthalate)-terpoly-(propoxylated bisphenol A-dodecenylsuccinate)-terpoly-(propoxylated bisphenol A-fumarate) and copoly-(propoxylated bisphenol A-terephthalate)-copoly-(propoxylated bisphenol A-dodecenylsuccinate)-copoly-(ethoxylated bisphenol A-terephthalate)-copoly-(ethoxylated bisphenol A-dodecenylsuccinate)-copoly-(propoxylated bisphenol A-trimellitate)-copoly-(ethoxylated bisphenol A-trimellitate) and wherein said shell polymer is selected from the group consisting of terpoly-(propoxylated bisphenol A-terephthalate)-terpoly-(propoxylated bisphenol A-dodecenylsuccinate)-terpoly-(propoxylated bisphenol A-fumarate) and copoly-(propoxylated bisphenol A-terephthalate)-copoly-(propoxylated bisphenol A-dodecenylsuccinate)-copoly-(ethoxylated bisphenol A-terephthalate)-copoly-(ethoxylated bisphenol A-dodecenylsuccinate)-copoly-(propoxylated bisphenol A-trimellitate)-copoly-(ethoxylated bisphenol A-trimellitate).

16. A cold pressure fix toner composition comprising a core comprising a mixture of a colorant, a wax, and a co-polyester-co-polydimethylsiloxane crystalline resin and an amorphous resin selected from the group consisting of copoly-(propoxylated bisphenol A-terephthalate)-copoly-(propoxylated bisphenol A-dodecenylsuccinate)-copoly-(propoxylated bisphenol A-fumarate), copoly-(propoxylated bisphenol A-terephthalate)-copoly-(propoxylated bisphenol A-dodecenylsuccinate)-copoly-(ethoxylated bisphenol A-terephthalate)-copoly-(ethoxylated bisphenol A-dodecenylsuccinate)-copoly-(propoxylated bisphenol A-trimellitate)-copoly-(ethoxylated bisphenol A-trimellitate), poly(propoxylated bisphenol A-co-fumarate), copoly(propoxylated bisphenol-fumarate)-copoly(trimethylolpropoxylated-bisphenol-fumarate), copoly(ethoxylated bisphenol-fumarate)-copoly(trimethylolpropoxylated-bisphenol-fumarate), copoly- (propoxylated bisphenol A-terephthalate)-copoly-(propoxylated bisphenol A-dodecenylsuccinate)-copoly-(propoxylated bisphenol A-fumarate)-(propoxylated bisphenol A-trimellitate), and copoly(propoxylated 1,4-diphenol-fumarate)-copoly(glycerinoxylated-diphenol-fumarate) and a shell encasing said core, which shell is selected from the group consisting of a styrene acrylate and an amorphous resin.

17. A toner in accordance with claim 16 wherein said amorphous resin for said shell is selected from the group consisting of copoly-(propoxylated bisphenol A-terephthalate)-copoly-(propoxylated bisphenol A-dodecenylsuccinate)-copoly-(propoxylated bisphenol A-fumarate), and copoly-(propoxylated bisphenol A-terephthalate)-copoly-(propoxylated bisphenol A-dodecenylsuccinate)-copoly-(ethoxylated bisphenol A-terephthalate)-copoly-(ethoxylated bisphenol A-dodecenylsuccinate)-copoly-(propoxylated bisphenol A-trimellitate)-copoly-(ethoxylated bisphenol A-trimellitate).

18. A cold pressure fix toner in accordance with claim 16 wherein said toner is generated by emulsion/aggregation/coalescent processes.

19. A toner in accordance with claim 16 wherein said co-polyester-co-polydimethylsiloxane crystalline resin is present in an amount of from about 10 percent by weight to about 75 percent by weight of the toner, and said amorphous resin is present in an amount of from about 25 to about 50 percent by weight of the toner.

\* \* \* \* \*